United States Patent
Park

(10) Patent No.: US 7,651,156 B2
(45) Date of Patent: Jan. 26, 2010

(54) IMPACT-ABSORBING DEVICE FOR VEHICLE HOOD

(75) Inventor: Woo Chul Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/272,435

(22) Filed: Nov. 17, 2008

(65) Prior Publication Data
US 2009/0295193 A1 Dec. 3, 2009

(30) Foreign Application Priority Data
May 30, 2008 (KR) .................. 10-2008-0050743

(51) Int. Cl.
*B62D 25/12* (2006.01)
(52) U.S. Cl. .................. 296/187.04; 296/187.09; 296/193.11; 180/69.2
(58) Field of Classification Search ............ 296/187.04, 296/187.09, 193.11, 193.09; 180/69.2, 69.21, 180/274
See application file for complete search history.

(56) References Cited

U.S. PATENT DOCUMENTS

| | | | | |
|---|---|---|---|---|
| 1,344,095 | A * | 6/1920 | Skala | 180/69.2 |
| 6,530,449 | B2 * | 3/2003 | Sasaki et al. | 180/274 |
| 6,802,556 | B2 * | 10/2004 | Mattsson et al. | 296/187.09 |
| 2009/0026807 | A1 * | 1/2009 | Wang et al. | 296/193.11 |

FOREIGN PATENT DOCUMENTS

| | | | |
|---|---|---|---|
| KR | 2002-0039758 A | | 5/2002 |
| KR | 2002044305 A | * | 6/2002 |
| KR | 2002044307 A | * | 6/2002 |
| KR | 2002044308 A | * | 6/2002 |
| KR | 10-2003-0016006 A | | 2/2003 |
| KR | 2005016857 A | * | 8/2003 |
| KR | 10-2004-0049954 A | | 6/2004 |

* cited by examiner

*Primary Examiner*—Jason S Morrow
(74) *Attorney, Agent, or Firm*—Morgan, Lewis & Bockius LLP

(57) ABSTRACT

An impact-absorbing device is installed at a leading edge of a vehicle hood to protect a pedestrian. The impact-absorbing device includes a fixing member fixed to a body frame on an inside of the vehicle hood and having a guide portion formed at a front end thereof, a buffer member fixed to an upper surface of the guide portion and having specified torsional rigidity, a center portion of the buffer member being bent in a convex shape, first and second supports, each provided in the center portion and both ends of the buffer member, for supporting the leading edge of the vehicle hood, and a guide member fixed to an upper surface of the buffer member and supporting the first support slidably.

13 Claims, 6 Drawing Sheets

IMPACT-ABSORBING DEVICE FOR VEHICLE HOOD

CROSS-REFERENCES TO RELATED APPLICATIONS

The present application claims priority to Korean patent application No. 10-2008-0050743, filed on May 30, 2008, the entire contents of which is incorporated herein for all purposes by this reference.

BACKGROUND OF THE INVENTION

1. Field of the Invention

The present invention relates to an impact-absorbing device for a vehicle hood, and more particularly, to an impact-absorbing device provided at a leading edge of a vehicle hood, which device can absorb the impact applied to a pedestrian hit by the leading edge of the vehicle hood, thereby minimizing the risk of the pedestrian injury.

2. Description of Related Art

Regulations on pedestrian safety to protect pedestrians from injury when hit by a vehicle were embodied and expressed concretely in 1999. The enactment of the regulations has been promoted in Europe since 2002.

FIG. 1 is a perspective view of a vehicle to explain a pedestrian collision test.

According to the regulations on pedestrian safety, as shown in FIG. 1, a pedestrian safety test is performed in four sections (A, B, C, and D in FIG. 1) defined on an upper surface of a hood of a vehicle 10. The safety test comprises adult head test sections A, child head test sections B, upper legform test sections C and lower legform test sections D.

The upper legform test sections C are designed to estimate the risk of femur and hip injury. More specifically, bending moments occurring at femur and hip fractures and the resultant force directly applied to the femur and hips are measured to assess the injury risk to the pedestrian hit by a vehicle.

An impact-absorbing device for absorbing the impact is installed at a leading edge of a hood in order to protect the femur and hips of the pedestrian in accordance with the measured values of the upper legform test section C.

FIG. 2 is a cross-sectional view illustrating a conventional impact-absorbing device.

The impact-absorbing device includes a form member 20 provided in an inside of a leading edge of a hood 13 with a damping force, so that when a pedestrian is hit by the hood 13 of a vehicle, the form member 20 cushions the impact of the pedestrian's femur and hips against the hood to minimizing the risk of pedestrian injury.

However, since the femur and hips of the pedestrian are formed in a convex curved surface, only a portion of the femur and hips is cushioned by the form member 20 of the impact-absorbing device, and thus the hit portion is not effectively supported. Consequently, there is a limit to minimizing the risk of pedestrian injury.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention are directed to solving the above-mentioned problems found in the prior art while maintaining advantages already achieved by the prior art.

One aspect of the present invention is directed to providing an impact-absorbing device installed at a leading edge of a hood that effectively supports most of the femur and hips of a pedestrian hit by a vehicle in order to remarkably minimize the risk of pedestrian injury.

In order to accomplish these aspects, there is provided an impact-absorbing device installed at a leading edge of a hood to protect a pedestrian. In accordance with the present invention, the device may include a fixing member fixed to a body frame in an inside of the hood and having a guide portion formed at a front end thereof; a buffer member mounted onto to an upper surface of the guide portion and having specified torsional rigidity, a center portion of the buffer member bent in a convex shape towards the hood; a first support provided in the center portion of the buffer member to support the leading edge of the hood in an impact of a vehicle; at least a second support fixed to distal ends of the buffer member, to support the leading edge of the hood in the impact of the vehicle; and a guide member mounted to an upper surface of the buffer member and supporting the first and second supports slidably.

A concave round surface may be formed on the upper surface of the guide portion to allow the buffer member to bend in a concave shape in the impact of the vehicle.

A front end of the first support may be positioned more adjacent to the leading edge of the hood than a front end of the second support. The first and second supports may be positioned substantially in parallel each other. Longitudinal axis of the first support may be substantially in parallel to normal vector of the leading edge.

The first and second supports may have support portions at front ends thereof to increase a support area. The first support may have a protrusion at rear end thereof to limit movement of the first support in a predetermined distance. The first and second support portions may be movably inserted and fixed in receiving grooves formed at the front ends of the first and second supports, and elastic members are inserted in the receiving grooves to resiliently support the support portions. The elastic members may be springs.

The buffer member may be a leaf spring.

In another aspect of the present invention, an impact-absorbing device installed at a leading edge of a hood to protect a pedestrian, may include: a fixing member fixed to a body frame in an inside of the hood and having a guide portion formed at a front end thereof; a buffer member mounted onto to an upper surface of the guide portion and having specified torsional rigidity, a center portion of the buffer member bent in a convex shape towards the hood; a first support provided in the center portion of the buffer member to support the leading edge of the hood in an impact of a vehicle; at least a second support fixed to distal ends of the buffer member, to support the leading edge of the hood in the impact of the vehicle; and a guide member mounted to an upper surface of the buffer member and supporting the first and second supports slidably, wherein a concave round surface is formed on the upper surface of the guide portion to allow the buffer member to bend in a concave shape in the impact of the vehicle, a front end of the first support is positioned more adjacent to the leading edge of the hood than a front end of the second support, and the first and second supports have support portions at front ends thereof to increase a support area.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An impact-absorbing device according to preferred embodiments of the present invention will now be described in detail with reference to FIGS. 3 to 6.

Figure 1:
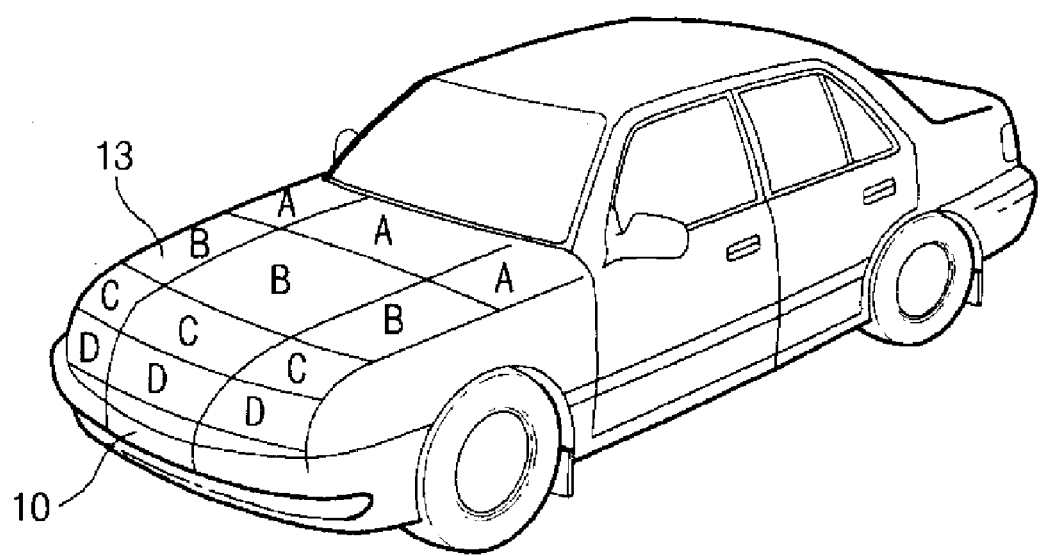
FIG. 1 is a perspective view of an exemplary vehicle for illustrating a pedestrian collision test.
Figure 2:
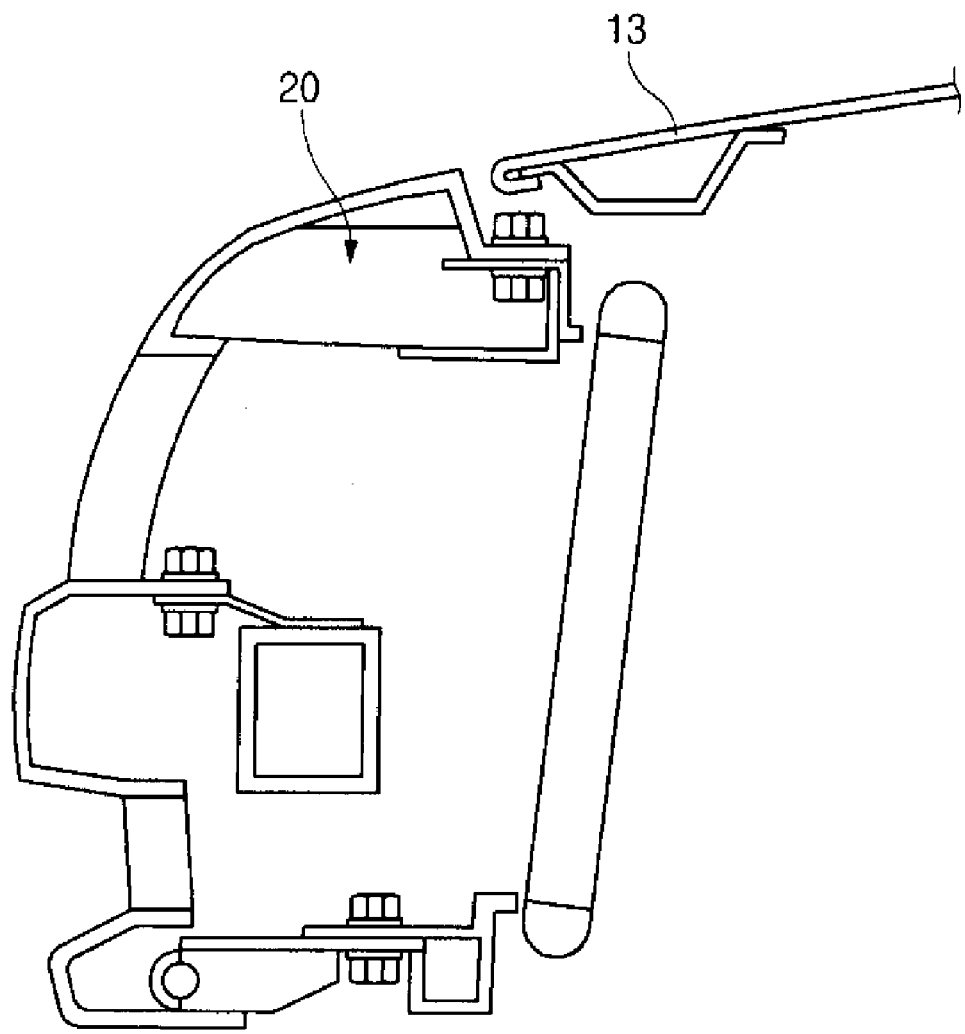
FIG. 2 is a cross-sectional view illustrating a conventional impact-absorbing device.
Figure 3:
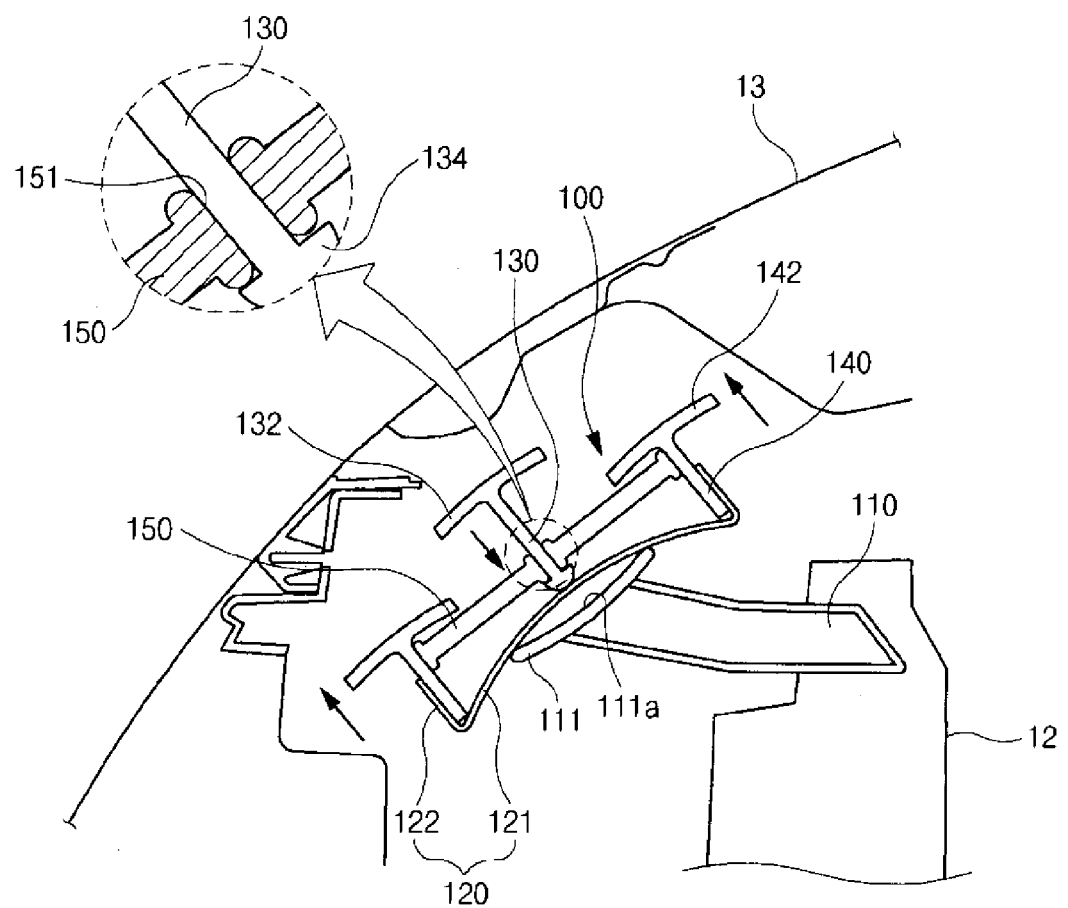
FIG. 3 is a cross-sectional view illustrating an exemplary impact-absorbing device according to various aspects of the present invention.

An impact-absorbing device 100 for a hood according to an exemplary embodiment of the present invention is configured to minimize the risk of femur and hip injury of a pedestrian hit by a vehicle. As shown in FIG. 3, the device includes a fixing member 110 secured to a body frame 12 which is interposed between a leading edge of a hood 13 and a radiator grill (not shown), a buffer member 120 provided at a front end of the fixing member 110, first and second supports 130 and 140 provided on the upper surface of the buffer member 120, and a guide member 150 fixing the first support 130 so that the first support 130 is slid in the fixing member 110.

The fixing member 110 is configured to fix the impact-absorbing device 100 to the body frame 12. A distal end of the fixing member 110 is inserted in and fixed to the engaged groove formed on the body frame 12, and a guide portion 111 is formed at a front end of the fixing member 110 to guide the stable distortion of the buffer member 120 which will be described hereinafter.

The guide portion 111 has a vertical width sufficient to support the buffer member 120 and a horizontal area sufficient to substantially cover the whole front end of the hood 13. A concave round surface 111a is formed on the upper surface of the guide portion 111 to guide the depressed distortion of the convex buffer member 120.

The buffer member 120 is configured to absorb the impact transmitted from the hood 13, and includes a buffer portion 121 fixed to the upper surface of the guide portion 111 and having specified torsional rigidity, a center portion thereof being bent in a convex shape, and a flange portion 122 bent from both ends of the buffer portion 121 towards the hood 13 and supporting the second support 140.

More specifically, when the center portion of the convex buffer portion 121 is depressed, the center portion of the buffer portion 121 is deflected and supported by the center portion of the round surface 111a of the guide portion 111. At the same time, both ends of the buffer portion 121 rise while contacting with the round surface 111a, so that the buffer portion 121 snaps into a convex shape to provide torsional rigidity.

The first and second supports 130 and 140 are interposed between the hood 13 and the buffer member 120 to transmit the impact from the hood 13 to the buffer member 120.

More specifically, the lower end of the first support 130 is supported by the center portion of the buffer portion 121, and the upper end thereof is positioned adjacent the bottom surface of the hood 13. The lower end of the second support 140 is fixed to the flange portions 122 formed at both ends of the buffer portion 121, and the upper end thereof is positioned adjacent to the hood 13.

Figure 4:
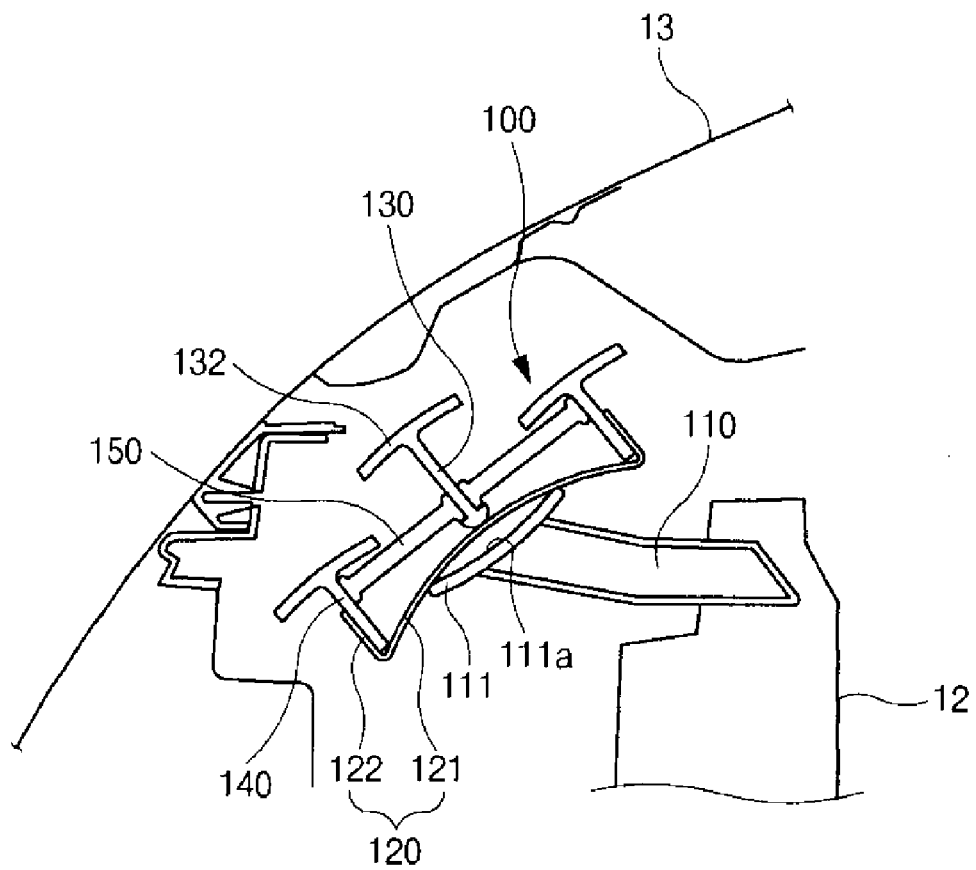
FIG. 4 is a cross-sectional view illustrating the exemplary impact-absorbing device of FIG. 3 prior to activation.

As shown in FIG. 4, the first support 130 is normally positioned at a position higher than the second support 140 by the convex buffer portion 121 of the buffer member 120, so that the leading edge of the hood 13 is supported only by the first support 130.

Figure 5:
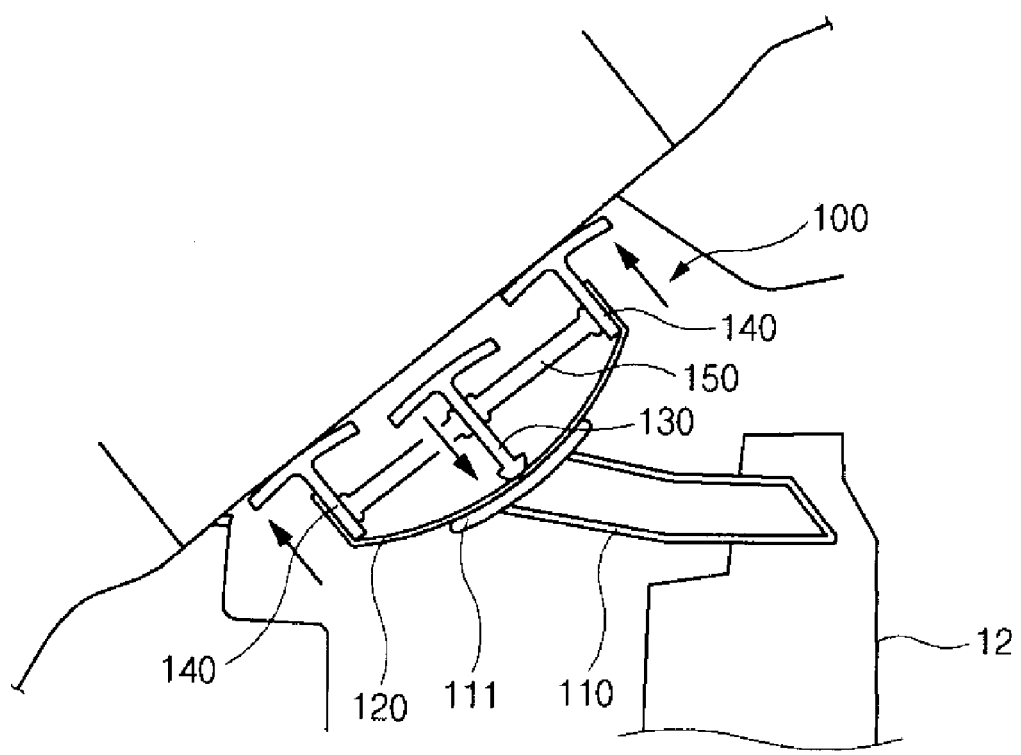
FIG. 5 is a cross-sectional view illustrating the exemplary impact-absorbing device of FIG. 3 during activation.

When the hood 13 is depressed by the hips of a pedestrian hit by a vehicle, the first support 130 is moved down by the hood 13, as shown in FIG. 5. As the first support 130 is lowered, the center portion of the buffer portion 121 is pressed to primarily absorb the impact. When the center portion of the buffer portion 121 is deflected, the buffer portion 121 is then deformed in a concave shape by the guide portion 111. In this instance, the second supports 140 protrude along both ends of the buffer portion 121 in comparison with the first support 130, thereby secondarily absorbing the impact.

Support portions 132 and 142 may be formed, respectively, at the front ends of the first and second supports 130 and 140 to effectively support the wide area of the hood 13.

Protrusion 134 may be formed at the rear end of the first support 130 so as to limit movement of the first support 130 in a predetermined distance.

The guide member 150 is configured to support vertical movement of the first support 130, and is fixed to the upper surface of the buffer member 120 at a specified interval. The center portion of the guide member 150 is provided with a through-hole 151 so that the lower end of the first support 130 is slidably engaged to the guide member 150. An outer surface of the guide member 150 is extended to slidably support a side portion of the second support 140.

The operation of the impact-absorbing device for the hood will now be described.

When a pedestrian is hit by a vehicle, a pedestrian's knee collides primarily against a bumper, and then the pedestrian's femur and hips collide secondarily against the leading edge of the hood panel 13. In this instance, the hood 13 is resiliently supported by the first support 130 which is supported by the center portion of the convex buffer portion 121 of the buffer member 120, thereby primarily absorbing the impact applied to the pedestrian's femur and hips.

Then, as the first support 130 is lowered, the convex buffer portion 121 is deformed in a concave shape by the round surface 111a of the guide portion 111. In this instance, the second support 140 fixed to the flange portion 122 is raised relative to the first support 130, so that the hood 13 is resiliently supported to secondarily absorb the impact applied to the pedestrian's femur and hips.

The impact-absorbing device 100 absorbing the impact in two steps can decrease the impact applied to the pedestrian's femur and hips, thereby minimizing the risk of the pedestrian injury.

An impact-absorbing device according to another preferred embodiment of the present invention will now be described, in which the same drawing reference numerals are used for the same elements across various figures, and the detailed description thereof will be omitted.

Figure 6:
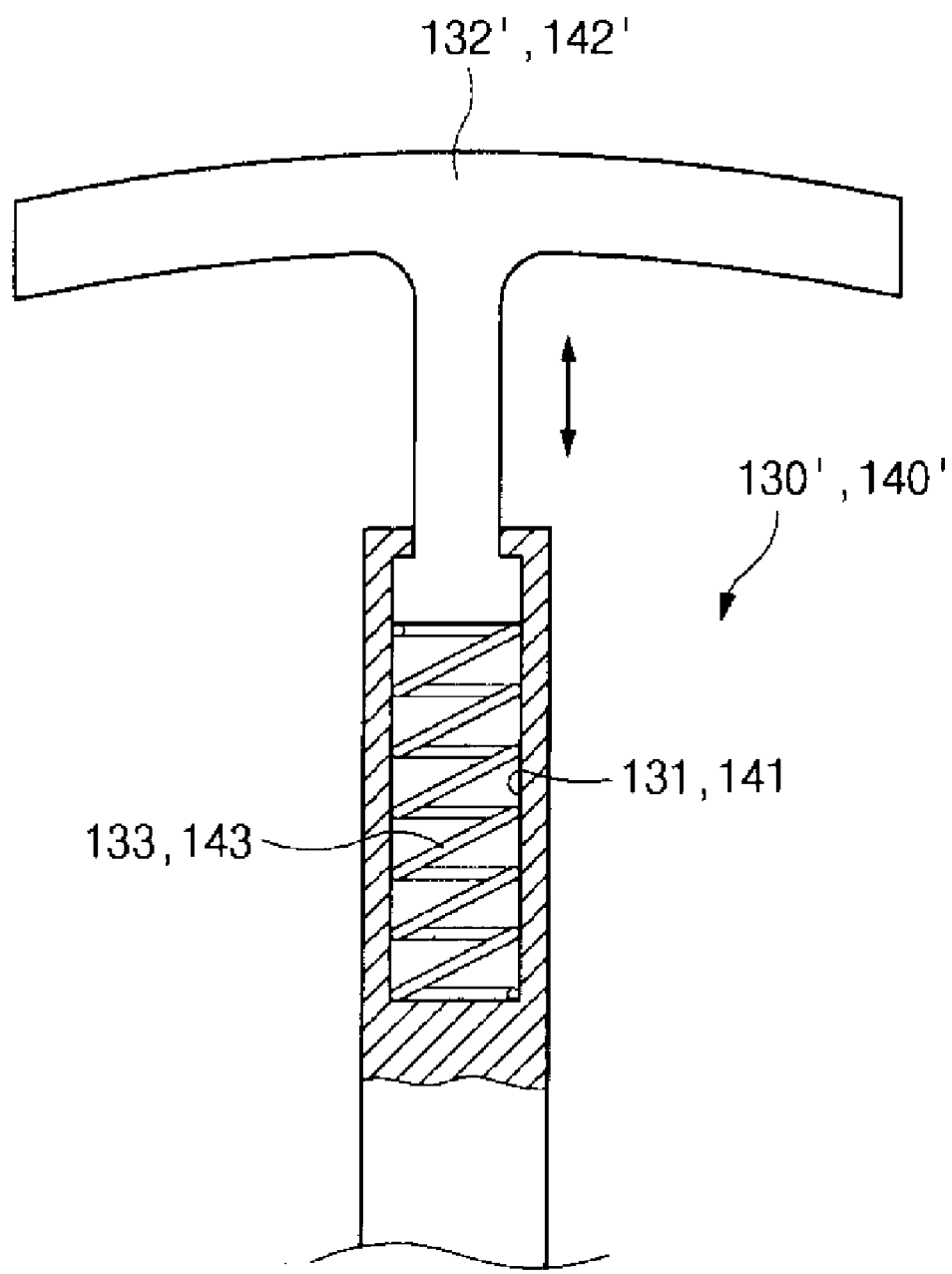
FIG. 6 is a cross-sectional view illustrating an exemplary impact-absorbing device according to other aspects of the present invention.

FIG. 6 shows alternative first and second supports 130 and 140 in accordance with various aspects of the present invention.

First and second supports 130' and 140' are configured to further absorb the force of impact applied to the pedestrian's femur and hips by providing the first and second supports 130 and 140 with a resilient force. Receiving grooves 131 and 141 are formed at front ends of the first and second supports 130' and 140', and support portions 132' and 142 are slidably inserted and fixed in the receiving grooves 131 and 141. Springs 133 and 143 are interposed between the receiving grooves 131 and 141 and the support portions 132' and 142'.

More specifically, the first and second supports 130' and 140' may decrease the impact applied to the pedestrian's femur and hips by providing the hood 13 with the resilient force using the support portions 132' and 142' which are resiliently supported by the springs 133 and 143.

With the above construction, when the femur and hips of the pedestrian are hit by the vehicle, the impact applied to the femur and hips is primarily absorbed by the first support, and then is secondarily absorbed by the second support to remarkably decrease the impact and thus protect the pedestrian.

For convenience in explanation and accurate definition in the appended claims, the terms "up" or "upper", "down" or "lower", and "inside" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An impact-absorbing device installed at a leading edge of a vehicle hood to protect a pedestrian, comprising:
   a fixing member fixed to a body frame beneath the vehicle hood and having a guide portion formed at a front end thereof;
   a buffer member mounted onto to an upper surface of the guide portion and having specified torsional rigidity, a center portion of the buffer member having an initial convex shape towards the vehicle hood;
   a first support provided in the center portion of the buffer member to engage the leading edge of the vehicle hood during an impact of the vehicle hood;
   at least a second support fixed to distal ends of the buffer member, to support the leading edge of the vehicle hood during the impact of the vehicle hood; and
   a guide member mounted to an upper surface of the buffer member and slidably supporting the first and second supports.

2. The impact-absorbing device as claimed in claim 1, wherein a concave round surface is formed on the upper surface of the guide portion to allow the buffer member to bend into a concave shape upon the impact of the vehicle hood.

3. The impact-absorbing device as claimed in claim 1, wherein a front end of the first support is positioned more adjacent to the leading edge of the vehicle hood than a front end of the second support.

4. The impact-absorbing device as claimed in claim 3, wherein the first and second supports are positioned substantially in parallel each other.

5. The impact-absorbing device as claimed in claim 4, wherein longitudinal axis of the first support is substantially in parallel to normal vector of the leading edge.

6. The impact-absorbing device as claimed in claim 1, wherein the first and second supports have support portions at front ends thereof to increase a support area.

7. The impact-absorbing device as claimed in claim 6, wherein the first support has a protrusion at rear end thereof to limit movement of the first support in a predetermined distance.

8. The impact-absorbing device as claimed in claim 6, wherein the first and second support portions are movably inserted and fixed in receiving grooves formed at the front ends of the first and second supports, and elastic members are inserted in the receiving grooves to resiliently support the support portions.

9. The impact-absorbing device as claimed in claim 8, wherein the elastic members are springs.

10. The impact-absorbing device as claimed in claim 1, wherein the buffer member is a leaf spring.

11. An impact-absorbing device installed at a leading edge of a vehicle hood to protect a pedestrian, comprising:
    a fixing member fixed to a body frame in an inside of the vehicle hood and having a guide portion formed at a front end thereof;
    a buffer member mounted onto to an upper surface of the guide portion and having specified torsional rigidity, a center portion of the buffer member bent in a convex shape towards the vehicle hood;
    a first support provided in the center portion of the buffer member to support the leading edge of the vehicle hood during an impact;
    at least a second support fixed to distal ends of the buffer member, to support the leading edge of the vehicle hood during impact; and
    a guide member mounted to an upper surface of the buffer member and supporting the first and second supports slidably;
    wherein a concave round surface is formed on the upper surface of the guide portion to allow the buffer member to bend in a concave shape in the impact of the vehicle, a front end of the first support is positioned more adjacent to the leading edge of the vehicle hood than a front end of the second support, and the first and second supports have support portions at front ends thereof to increase a support area.

12. A passenger vehicle comprising the impact-absorbing device of claim 1 installed at the leading edge of the vehicle hood.

13. A passenger vehicle comprising the impact-absorbing device of claim 11 installed at the leading edge of the vehicle hood.

* * * * *